United States Patent
Carrig et al.

(10) Patent No.: US 8,165,205 B2
(45) Date of Patent: Apr. 24, 2012

(54) NATURAL SHAPED REGIONS FOR MOTION COMPENSATION

(75) Inventors: James J. Carrig, San Jose, CA (US); Marco Paniconi, Campbell, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1798 days.

(21) Appl. No.: 11/228,844

(22) Filed: Sep. 16, 2005

(65) Prior Publication Data

US 2007/0064796 A1    Mar. 22, 2007

(51) Int. Cl.
*H04N 7/12* (2006.01)
*H04N 11/02* (2006.01)

(52) U.S. Cl. ........ 375/240.08; 375/240.16; 375/E7.111; 375/E7.121; 375/E7.261

(58) Field of Classification Search ............ 375/240.08, 375/240.16, E7.111, E7.121, E7.261
See application file for complete search history.

(56) References Cited

U.S. PATENT DOCUMENTS

| | | | |
|---|---|---|---|
| 4,816,906 A | 3/1989 | Kummerfeldt et al. | |
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,052,414 A * | 4/2000 | Lee et al. ................. | 375/240.16 |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |
| 6,711,278 B1 * | 3/2004 | Gu et al. ...................... | 382/103 |
| 6,754,269 B1 | 6/2004 | Yamaguchi et al. | |
| 6,765,965 B1 | 7/2004 | Hanami et al. | |
| 6,766,055 B2 * | 7/2004 | Matsugu et al. ............ | 382/173 |
| 6,782,054 B2 | 8/2004 | Bellers | |
| 6,864,994 B1 | 3/2005 | Harrington | |
| 6,888,894 B2 | 5/2005 | Prakash et al. | |
| 2004/0057517 A1 | 3/2004 | Wells | |

(Continued)

FOREIGN PATENT DOCUMENTS

EP    0625853 A2    11/1994

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner* — Stephen Koziol (74) *Attorney, Agent, or Firm* — Blakely, Sokoloff, Taylor & Zafman LLP (57) ABSTRACT

A method of irregular motion compensation includes using contours of objects in a reference image to tile the reference image into a plurality of irregular shapes, and mapping each irregular shape to a location in a target image by assigning a motion vector to each irregular shape.

12 Claims, 8 Drawing Sheets

U.S. PATENT DOCUMENTS

| | | | |
|---|---|---|---|
| 2004/0062307 A1 | 4/2004 | Hallapuro et al. | |
| 2004/0131267 A1 | 7/2004 | Adiletta et al. | |
| 2004/0233991 A1 | 11/2004 | Sugimoto et al. | |
| 2005/0100092 A1 | 5/2005 | Sekiguchi et al. | |
| 2005/0135483 A1 | 6/2005 | Nair | |
| 2008/0180535 A1* | 7/2008 | Habuka et al. | 348/208.4 |
| 2009/0195698 A1* | 8/2009 | Chen et al. | 348/699 |

FOREIGN PATENT DOCUMENTS

| | | |
|---|---|---|
| EP | 0720373 A1 | 7/1996 |
| WO | WO 00/16563 A1 | 3/2000 |
| WO | WO 01/78402 A1 | 10/2001 |
| WO | WO 02/37859 A2 | 5/2002 |
| WO | WO 2004/047454 A1 | 6/2004 |
| WO | 2004/059983 A1 | 7/2004 |
| WO | WO 2005/069629 A1 | 7/2005 |
| WO | 2005/079074 A1 | 8/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

Seung Chul Yoon, et al., "Low Bit-Rate Video Coding with Implicit Multiscale Segmentation", IEEE Transactions on Circuits and Systems for Video Technology, vol. 9, No. 7, Oct. 1, 1999, XP011014630, ISSN: 1051-8215.

Woods, J C, et al., "Selective Macroblock Level Switching for Model-Based Coded Video", Electronics Letters, IEEE Stevenage, GB, vol. 35, No. 5, Mar. 4, 1999, pp. 388-389m XP006011850, ISSN: 0013-5194, DOI:10.1049/WL:19990264.

ESSR dated Jun. 24, 2011, 12 pgs.

* cited by examiner

NATURAL SHAPED REGIONS FOR MOTION COMPENSATION

FIELD OF INVENTION

The invention is related to the field of video compression.

BACKGROUND

High compression gains for video sequences can be achieved by removing temporal redundancies between images. For example, to encode an image, a temporal prediction of the image to be encoded is generated based on previously encoded images. The temporal prediction is compared with the actual image to determine the prediction error, and the prediction error is encoded. The prediction can be made with conventional block-based motion estimation and compensation methods.

Motion compensation and estimation methods are used to find a reference block in one or more reference images to predict the location of a corresponding target block in the target image, so that only motion vectors and a prediction residual of the target needs to be coded. These methods perform block matching to identify a reference block of pixels in the reference image that is most similar to a corresponding target block in the target image. The pixel distance between the reference block and corresponding target block is the motion vector for the target block.

Figure 1:
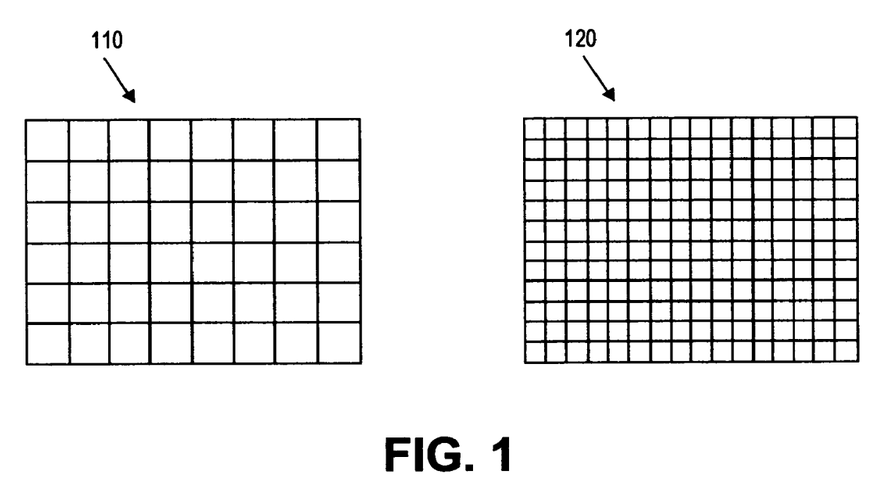
FIG. 1 shows two standard shape definitions that are typically applied to the target images.

The motion compensation procedure begins by tiling the target image and the reference image into fixed size blocks. FIG. 1 shows two standard shape definitions that are typically applied to the reference and target images. The first definition 110 tiles an image using non-overlapping 16-by-16 blocks of pixels. The second definition 120 uses 4-by4 blocks. These fixed size blocks, which are located at pre-defined areas in the target and reference images, are unrelated to the shapes and locations of objects in the image.

Generally, pixels on the target image are assigned to exactly one block. This one-to-one mapping is referred to as tiling. Each block is assigned a motion vector that maps it to a corresponding portion on a reference image. A compensated image, which approximates the target image, is then formed by using the mapping defined by the motion vectors to identify the corresponding reference blocks and then copying the pixel values from the reference block to the area defined by the target block.

The error between the desired target image and the compensated image is determined, and a residual correction for this error is then encoded. It is assumed that both the encoder and decoder have access to the same reference images. Therefore, only the motion vectors and residual corrections are transmitted to accomplish video coding.

A successful video coder balances many factors to generate a high-quality target image using limited computational resources. Of all these factors, the selection of reference data is possibly the most critical to video quality and the most costly in terms of computational resources. For example, if an object moves from one location in the reference image to another location in the target image, a motion vector should be able to map the object from the reference image to the target image.

However, conventional motion compensation methods use motion vectors that map pre-determined blocks, which rarely correspond to boundaries of moving objects. Because the shapes of the pre-determined blocks are unrelated to natural contours on moving objects in the reference image, the motion vector maps to a reference block that is partially related to the moving object, and partially unrelated to the moving object. This causes an increase in the error of the compensated image.

Therefore, there is a need for a method to identify natural contours of moving objects in the reference images to improve the quality of motion compensation.

SUMMARY

A method of irregular motion compensation includes using contours of objects in a reference image to tile the reference image into a plurality of irregular shapes, and mapping each irregular shape to a location in a target image by assigning a motion vector to each irregular shape.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field, frame, image, or picture that are used to describe the various embodiments are generally interchangeable as used with reference to video data.

A motion compensation method uses irregular shapes that are dynamically determined from the content of the reference image. Each irregular shape identifies a group of pixels that corresponds to a portion of a natural object in the reference image. The boundary of the shape therefore corresponds to the boundary of at least a portion of the object, rather than to a pre-determined block that is not associated with the object. When a motion compensation method assigns a motion vector to the irregular shape, the resulting mapping automatically aligns boundary of the irregular shape with the boundary of the object in the target image, and the compensation error is reduced.

Figure 2:
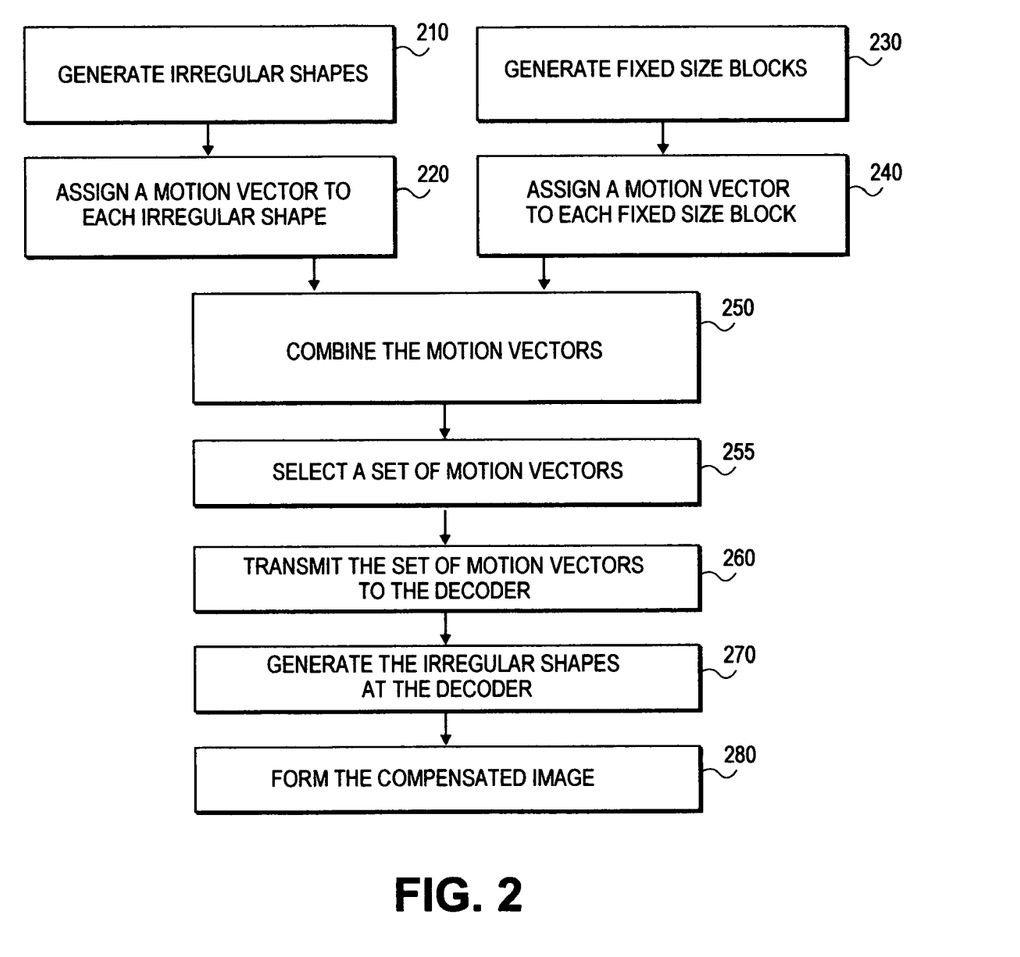
FIG. 2 shows an example of video coding using a motion compensation method that utilizes irregularly shaped regions and irregularly spaced motion vectors.

An example of using motion compensation utilizing irregular shapes within a video coder is shown in FIG. 2. At 210 an encoder finds natural contours of objects in a reference image, and generates irregular shapes from the natural contours to replace pre-defined fixed size blocks of conventional motion compensation. At 220 a motion vector is assigned to each irregular shape to map the shape to a location on the target image. At 230 fixed size blocks are defined on the target image. At 240 a motion vector is assigned to each fixed size block to map to a location on the reference image. At 250, the motion vectors for the irregular shapes and the motion vectors for the fixed size blocks are combined. At 255 a motion vector selection method selects a set of motion vectors that satisfies a rate-distortion criteria from the combined motion vectors for the irregular shapes and the fixed size blocks. In some embodiments, the selection method determines a compensated value for each target pixel that is mapped to multiple shapes, or no shapes at all. At 260 the set of motion vectors and the reference image are transmitted to a decoder. At 270, the irregular shapes are generated at the decoder. At 280, the compensated image is formed.

Figure 3:
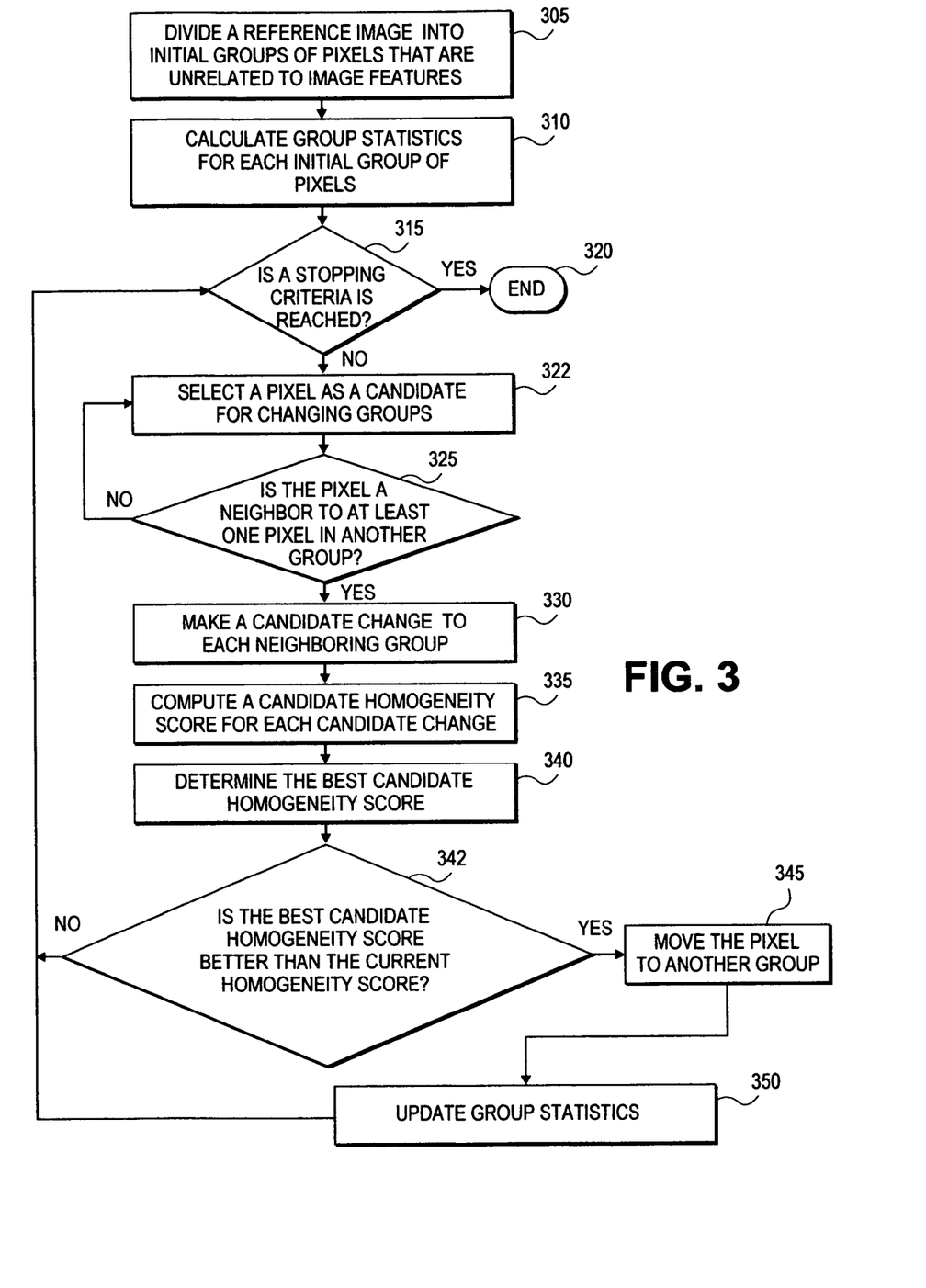
FIG. 3 shows an example of a method for finding natural contours of objects in a reference image.

Referring to 210 in greater detail, an example of a method for finding natural contours of objects in the reference image is shown in FIG. 3. At 305, a reference image is divided into initial groups of pixels that are unrelated to image features. At 310, group statistics are calculated for each initial group of pixels. One example of a group statistic is the color variance:

Color Variance=Variance($Y$)+2*Variance($U$)+2*Variance($V$)

where Variance(Y) is a statistical measure of variance applied to the luminance component of the pixels within the group and Variance(U) and Variance(V) are the variance of the color difference components of the pixels within the group.

At 315, if a stopping criteria is reached, the method ends at 320. Examples of stopping criteria include a pre-defined number of iterations, a number of changes, a total homogeneity measure. Another example is a time limit. When the method ends, the current groups are output for use as reference shapes.

Otherwise, at 322 a pixel is selected as a candidate for changing groups. In some embodiments, the pixel is selected randomly (or pseudo-randomly), selected according to a pre-defined order, or selected using a selection rule. At 325, the method determines whether the pixel is a neighbor to at least one pixel in another group. If not, the method returns to 320 to select another candidate pixel.

If so, then at 330 a candidate change is made to each neighboring group. For example, a candidate pixel in one group (group A) can be a neighbor to three groups (groups B, C, and D). To determine whether the candidate change results in a decrease of color variance for group A and an increase in color variance for the other groups, at 335 a candidate homogeneity score is computed for each candidate change. For example, a candidate change at 330 moves the candidate pixel from its current group (group A), to one of its neighbors, (for example, group B). Then, a candidate homogeneity score is calculated at 335 for group A and group B for this candidate change. Candidate changes are also made at 330 for groups C and D, and candidate homogeneity scores are also calculated at 335 for these candidate changes.

In one embodiment, the candidate homogeneity score records the maximum color variance of the group from which the candidate pixel was removed, and the group to which the candidate pixel is added. The smaller the homogeneity score, the more homogenous the resulting group is deemed to be. For example, when the starting color variance for group A is relatively high and decreases from the candidate change, and the color variance for group B is relatively small and increases from the candidate change, then the candidate homogeneity score is relatively low.

At 340, the best candidate homogeneity score is determined. In some embodiments, the best homogeneity score comes from a minmax criteria: the best score is that which yields the smallest maximum color variance. At 342, the method determines if the best candidate homogeneity score is better than the current homogeneity score. If so, then the pixel is moved to another group at 345, and at 350 any group statistics are updated to reflect this change. Otherwise, no change is made and the method returns to 315.

Figure 4:
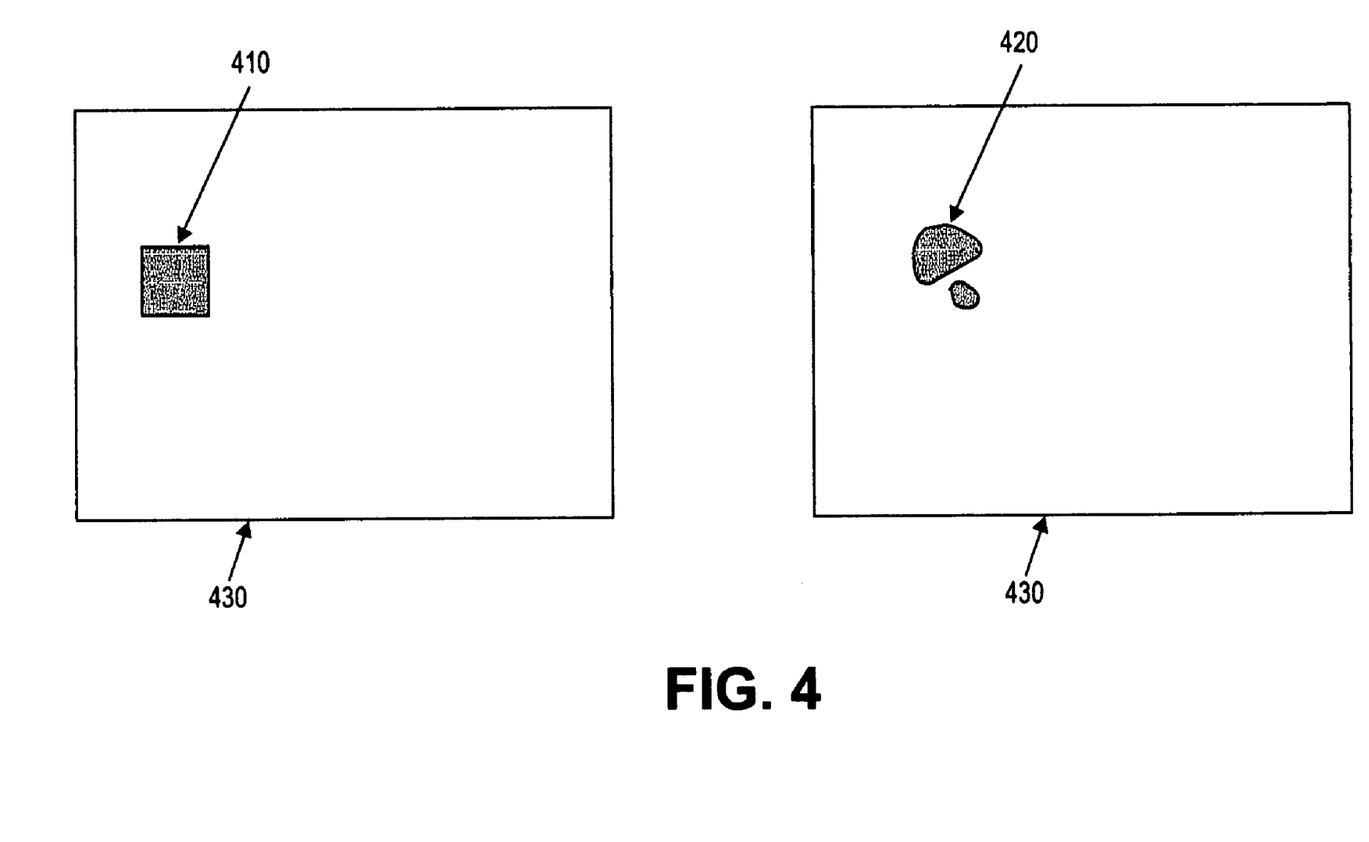
FIG. 4 shows an example of an irregular shape that is generated using the method of FIG. 3.

After performing the method for finding natural contours of objects in the reference image, pre-defined blocks are transformed from pixels unrelated to image features into an irregular shape of pixels that follow image features. Each resulting irregular shape of pixels is not necessarily a connected set. An example of an irregular shape that is generated using the method of FIG. 3 is shown in FIG. 4. An initial group of pixels 410 in a reference image 430 is transformed into a group of pixels with an irregular shape 420 having contours that are correlated with features of the reference image. In some embodiments, the initial group 410 is a pre-defined shape, such as a block, or is input from another source, such as a previously encoded image. The method outputs an irregular shape which, in this example, is a disconnected group of pixels 420. If desired, the disconnectedness can be controlled by limiting the total number of iterations, or by favoring connectedness in the homogeneity score.

If a target pixel is mapped to multiple shapes, a target pixel value is determined using the multiple shapes. Regions in the target image can map to multiple shapes in a single reference image because the method for finding natural contours of objects in the reference image tiles the reference image instead of the target image. Conversely, there can be pixels in the target image which do not map to any pixels on the irregularly tiled reference image.

In some embodiments, a value for a target pixel that maps to multiple reference shapes is determined from an average of the reference pixel values in the multiple reference shapes as the compensated value of the target pixel. For example, a recursive formula for computing the average of N reference pixel values is especially useful when the total number of reference shapes is unknown in advance. That is, given $\bar{x}_N$, which is the average of $x_1, x_2, \ldots, x_N$ pixel values, compute $\bar{x}_{N+1}$ using the recursive update formula:

$$\bar{x}_{N+1} = \frac{(N\bar{x}_N + x_{N+1})}{N+1}$$

and store the running average, $\bar{x}_N$, and the running number of reference shapes, N.

Figure 5:
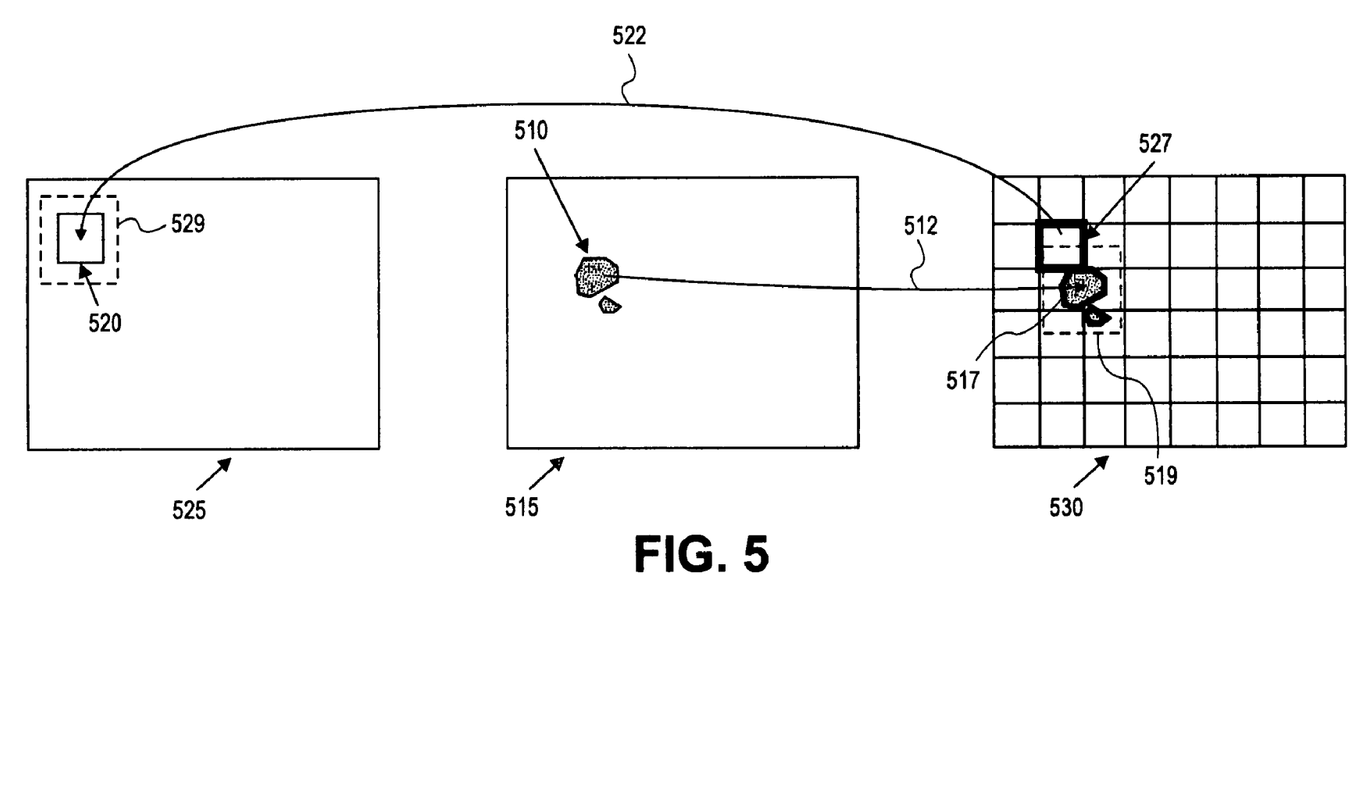
FIG. 5 shows an example of an irregular shape combined with a fixed size block.

In some embodiments, target pixels that are not mapped to any reference pixels are compensated using a pre-determined value, for example 128, or an interpolated value. Alternatively, fixed size blocks that cover the entire target image are generated. The motion vectors for the fixed size blocks are then combined with the motion vectors for the irregular shapes. For example, as shown in FIG. 5, motion vector 512 maps irregular shape 510 from reference image 515 to a matching shape of pixels 517 in target image 530. A motion vector 522 maps a pre-defined fixed size block 527 from target image 530 to a matching fixed size block 520 in reference image 525.

The directionality of the motion vectors 512 and 522 indicates where the initial shape tiling was done. In the case of the pre-defined fixed size block 527, this tiling corresponds to a pre-defined area on the target image 530. Thus, when generating the motion vector 522 for fixed size block 527, a search area 529 in the reference image 525 is examined to identify a displacement of reference block 520 from the corresponding fixed size target block 527. In the case of the irregular shape 510, the tiling was performed on reference image 515. When generating the motion vector 512 for irregular shape 510, a search area 519 in the target image 530 is examined to identify a displacement of the matching shape 517 from the corresponding irregular shape 510 in reference image 515.

The motion vectors for the irregular shapes and fixed size blocks, when combined, form a set of candidate motion vectors. A motion vector selection method selects motion vectors from the candidate set of motion vectors which are nearly optimal from a rate-distortion point of view. The selected motion vectors form an irregular pattern of motion vectors, which are then sent to the decoder. The decoder then uses the motion vectors for the irregular shapes and the motion vectors for the pre-defined fixed size blocks, along with the reference images, to form a compensated image.

The decoder can retrieve the shape of the fixed size block from a shape definition library, or the shape definition of the fixed size block can be transmitted to the decoder. However, the shape definition of the irregular shape is not transmitted to the decoder, in order to reduce the amount of data that is transmitted. Instead, the definition of each irregular shape is generated at the decoder, using the method of FIG. 3. Since both the encoder and decoder have the same reference images, they are able to deduce the same shape information without transmission of additional bits by applying the same method to the reference image to generate the irregular shapes. Therefore, the definitions of the irregular shapes do not need to be sent from the encoder to the decoder. In some embodiments, a few bits specifying a stopping criteria, such as the number of iterations performed, are transmitted to the decoder to guarantee synchronization between the encoder and decoder.

Figure 6:
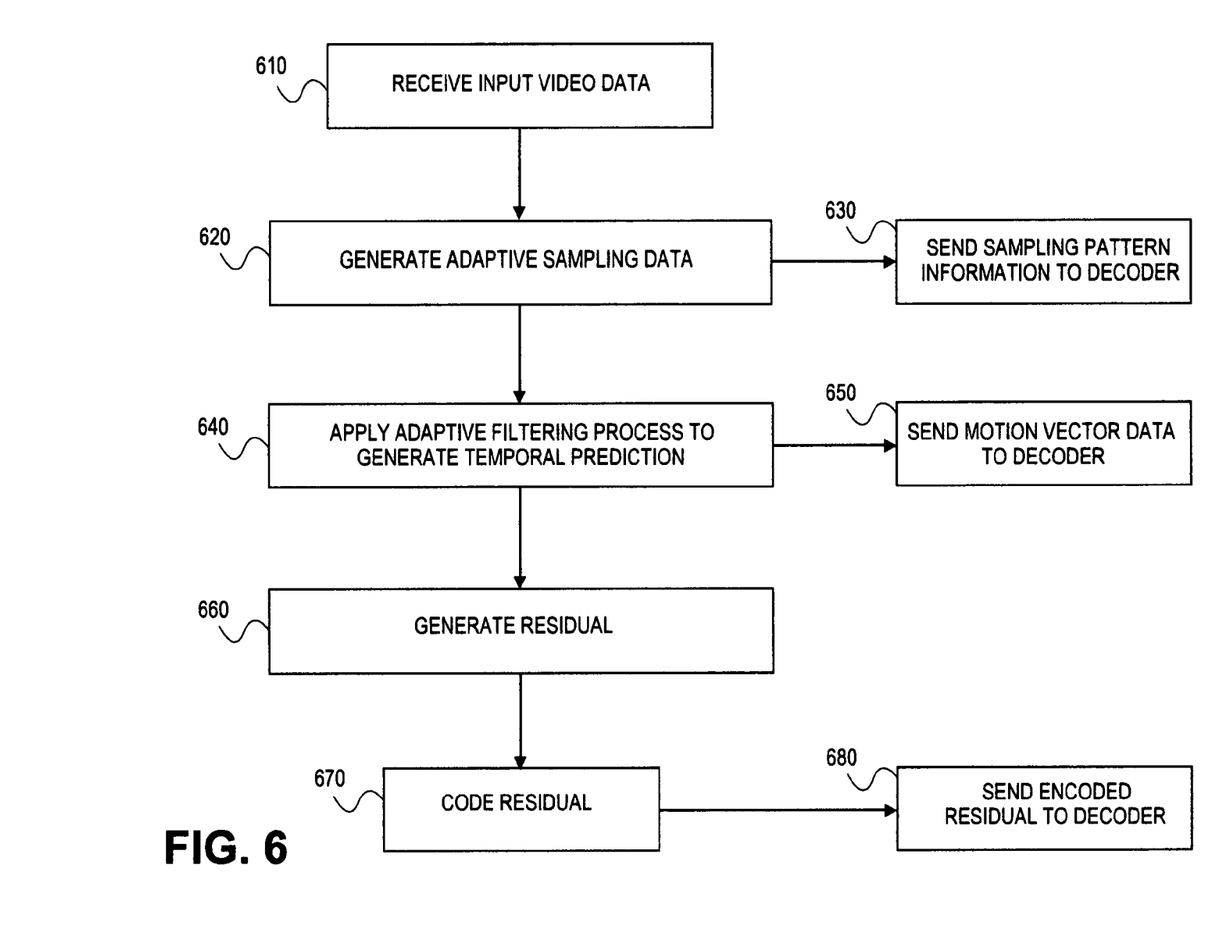
FIG. 6 shows an example of performing video coding for encoding an image of video data using the irregular motion compensation method.

In one embodiment, the compensation method is used in video coding for encoding an image (or frame, or field) of video data, as shown in FIG. 6. At 610, the encoder receives an input target image. (A set of reference images, which contain decoded image data related to the target image, is available to the encoder during the encoding process, and also to the decoder during the decoding process). At 620, the encoder generates irregular shapes and an irregular sampling, or distribution, of motion vectors associated with the target image using the methods shown in FIGS. 2 and 3. At 630, the sampling pattern information (e.g., bits to represent the pattern) is transmitted to a decoder.

At 640, a temporal prediction filtering process is applied to the irregular motion vector sampling pattern to generate a prediction of the target image. At 650, the motion vector values are coded and sent to the decoder. At 660, a residual is generated, which is the actual target data of the target image minus the prediction error from the adaptive filtering process. At 670, the residual is coded, and at 680 is sent to the decoder.

Figure 7:
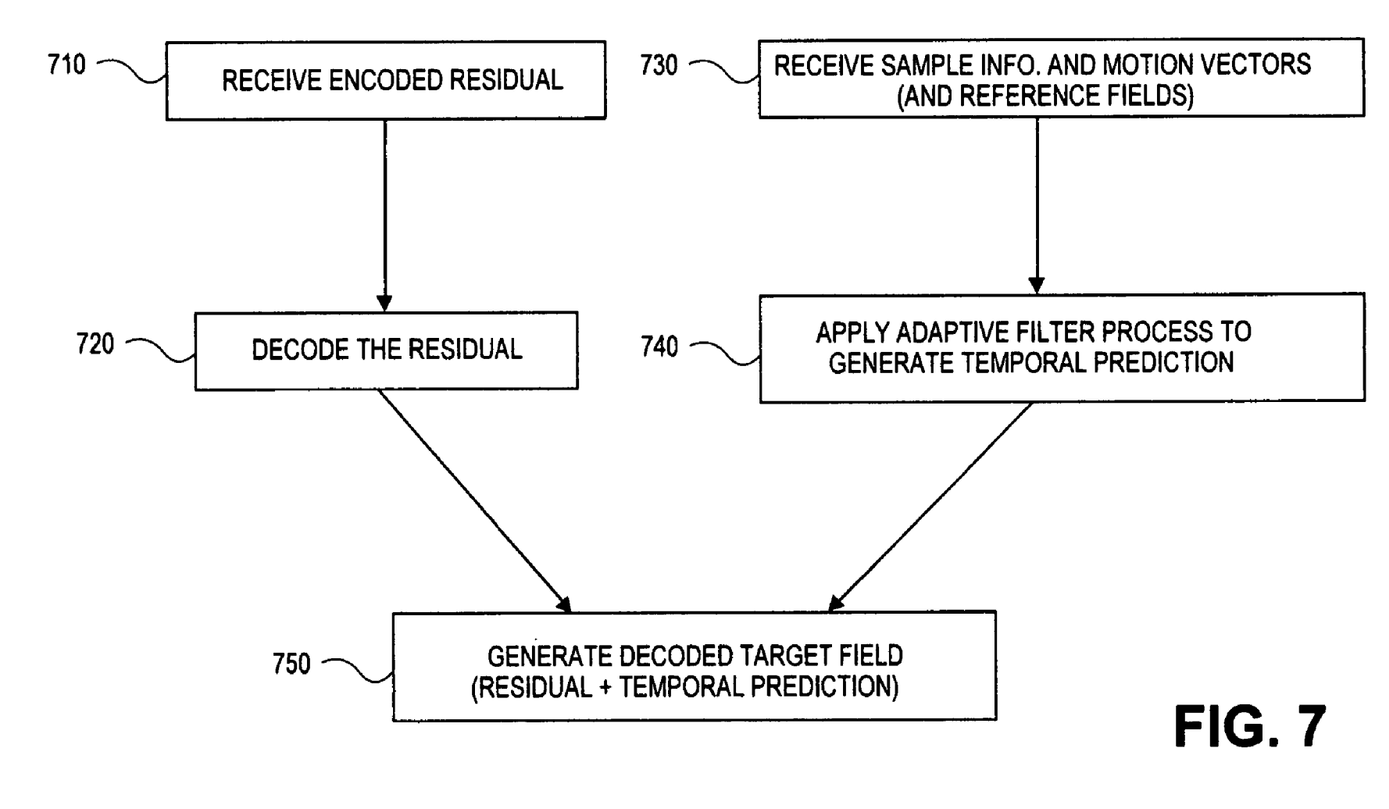
FIG. 7 shows an example of decoding an image using the irregular compensation method.

In another embodiment, the irregular pattern of motion vectors and the irregular compensation method are used in decoding a image (or frame, or image) of video data, as shown in FIG. 7. At 710, an encoded residual is received. At 720, the decoder decodes the received encoded residual. At 730, the decoder receives the sample pattern information, reference images, and motion vector values, and generates the irregular shapes using the method of FIG. 3. Then, at 740 the decoder applies an adaptive temporal filter procedure to generate the temporal prediction. At 750, the decoded target image is generated by adding the decoded residual to the temporal prediction.

Figure 8:
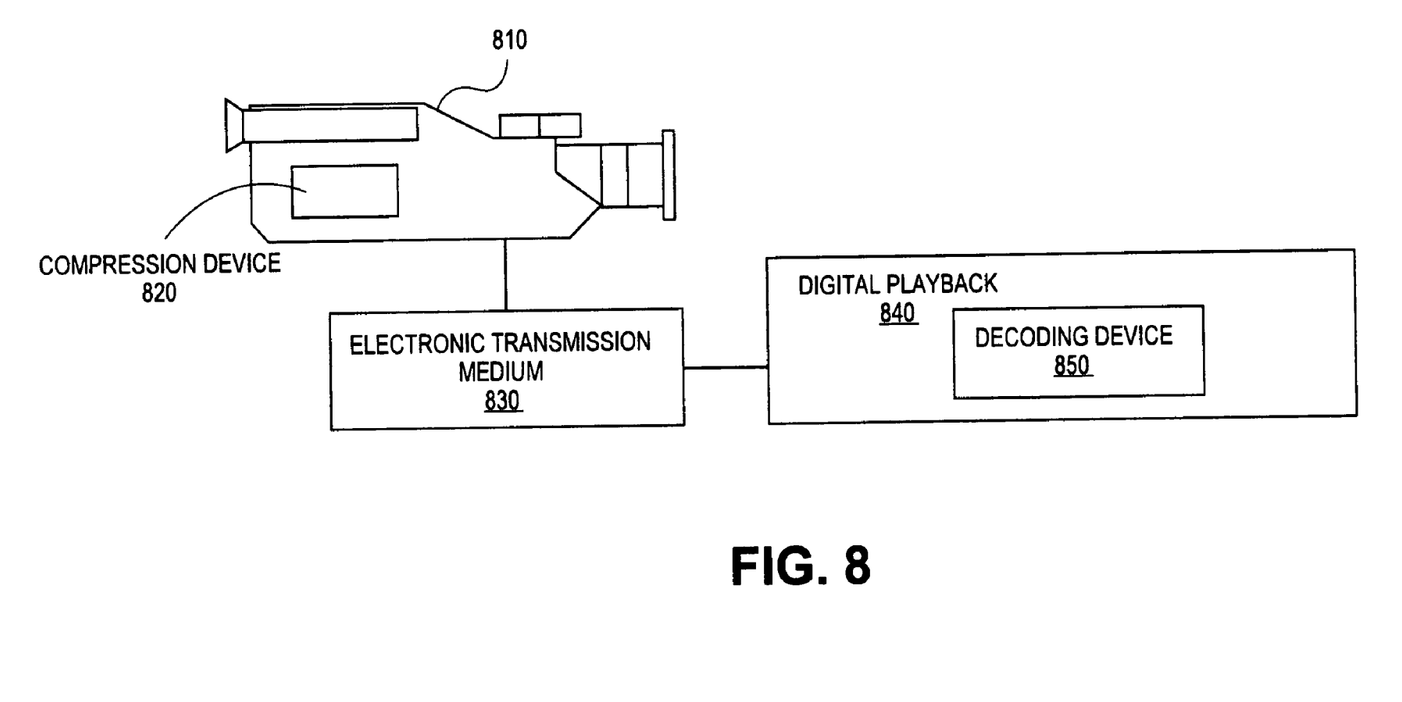
FIG. 8 shows an example of a system that uses the irregular compensation method.

FIG. 8 shows an example of a system that generates and uses the irregular shapes using the methods of FIGS. 2 and 3. A digital video camera 810 captures images in an electronic form, and processes the images using compression device 820, which uses the motion compensation method during the compression and encoding process. The encoded images are sent over an electronic transmission medium 830 to digital playback device 840. The images are decoded by decoding device 850, which uses the method of FIG. 3 during the decoding process. Camera 810 is illustrative of various image processing apparatuses (e.g., other image capture devices, image editors, image processors, personal and commercial computing platforms, etc.) that include embodiments of the invention. Likewise, decoding device 850 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out by an electronic data processor, comprising:
    using contours of objects in a reference image to tile the reference image into a plurality of irregular shapes;
    mapping each irregular shape to a location in a target image by assigning a motion vector to each irregular shape;
    tiling the target image into a plurality of fixed size blocks;
    mapping the fixed size block to an area in the reference image by assigning a motion vector to each fixed size block; and
    combining the motion vectors for the fixed size blocks and the motion vectors for the irregular shapes into a combined set of motion vectors.

2. The method of claim 1, further comprising:
    transmitting the motion vectors to a decoder; and
    using the transmitted motion vectors and the reference image to form a compensated image.

3. The method of claim 2, wherein using the transmitted motion vectors and the reference image to form the compensated image comprises:
    using a decoder to tile the reference image into the plurality of irregular shapes.

4. The method of claim 3, wherein a portion of a first irregular shape and a portion of a second irregular shape are mapped to an overlapping location in the compensated image, the method further comprising:
    using the first and second irregular shapes to determine a value for each pixel in the overlapping location.

5. An apparatus comprising:
    an irregular shape generator that uses contours of objects in a reference image to tile the reference image into a plurality of irregular shapes;
    a motion vector assignment device that maps each irregular shape to a location in a target image by assigning a motion vector to each irregular shape;
    a fixed size tiling device to tile the target image into a plurality of fixed size blocks;
    a fixed size block assignment device that maps the fixed size block to an area in the reference image by assigning a motion vector to each fixed size block; and a combiner that combines the motion vectors for the fixed size blocks and the motion vectors for the irregular shapes into a combined set of motion vectors.

6. The apparatus of claim 5, further comprising:

a transmitter that transmits the motion vectors and the reference image; and a decoder that receives the transmitted motion vectors and uses the transmitted motion vectors and the reference image to form a compensated image.

7. The apparatus of claim 6, wherein the decoder is configured to tile the reference image into the plurality of irregular shapes.

8. The apparatus of claim 7, wherein the decoder is configured to map a portion of a first irregular shape and a portion of a second irregular shape to an overlapping location in the compensated image, the decoder further configured to use the first and second irregular shapes to determine a value for each pixel in the overlapping location.

9. A non-transitory computer readable medium storing a compute program of instructions which, when executed by processing system, cause the system to perform a method comprising:

using contours of objects in a reference image to tile the reference image into a plurality of irregular shapes;

mapping each irregular shape to a location in a target image by assigning a motion vector to each irregular shape;

tiling the target image into a plurality of fixed size blocks;

mapping the fixed size block to an area in the reference image by assigning a motion vector to each fixed size block; and combining the motion vectors for the fixed size blocks and the motion vector for the irregular shapes into a combined set of motion vectors.

10. The non-transitory computer readable medium of claim 9, further comprising:

transmitting the motion vectors and the reference image to a decoder; and using the transmitted motion vectors and the reference image to form a compensated image.

11. The non-transitory computer readable medium of claim 10, wherein using the transmitted motion vectors and the reference image to form a compensated image comprises:

using a decoder to tile the reference image into the plurality of irregular shapes.

12. The non-transitory computer readable medium of claim 11, wherein a portion of a first irregular shape and a portion of a second irregular shape are mapped to an overlapping location in the compensated image, further comprising:

using the first and second irregular shapes to determine a value for each pixel in the overlapping location.

* * * * *